P. ALLING.
Walking Planter.
No. 105,621. Patented July 26, 1870.
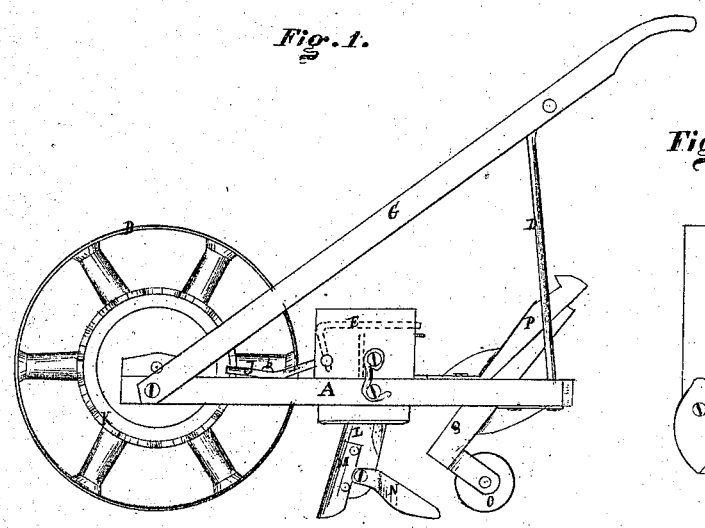
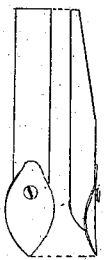
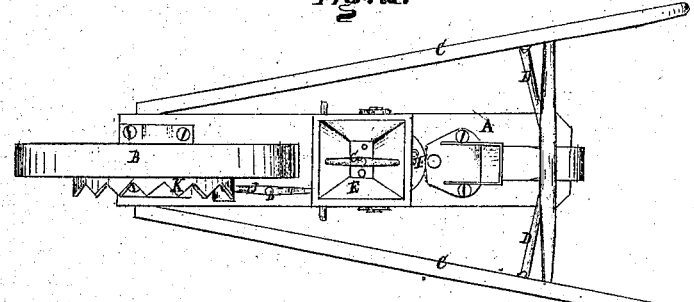
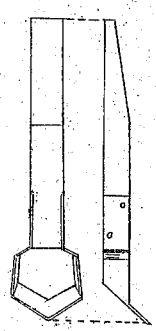
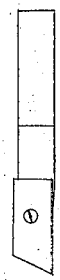
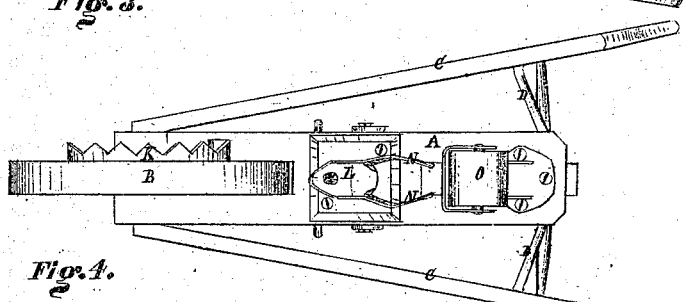
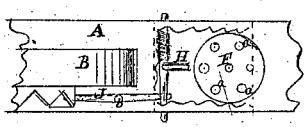

United States Patent Office.

PRUDDEN ALLING, OF NORWALK, OHIO.

Letters Patent No. 105,621, dated July 26, 1870.

IMPROVEMENT IN SEED-PLANTERS.

The Schedule referred to in these Letters Patent and making part of the same.

Be it known that I, PRUDDEN ALLING, of Norwalk, in the county Huron and State of Ohio, have invented certain new and useful Improvements in Seed-Planters, of which the following is a description.

Figure 1 is a side view of the seeding-machine.
Figure 2, a view of the top.
Figure 3, a view of the under side.
Figure 4 a detached section.
Figures 5, 6, and 7 are detached sections.

Like letters of reference refer to like parts in the different views.

This invention relates to a machine for planting seed, the same being so constructed that the seed falls from a hopper through a conductor to the ground into a furrow made by a share, which is then covered by a scraper and pressed down by a roller.

The machine may, also, be used for cultivating the ground, by substituting for the roller and scraper a scuffle-hoe and share, as hereinafter shown and described.

In the drawing, fig. 1—

A represents the beam of the machine, the front end of which is bifurcated and mounted upon the wheel B.

To the front end of the beam is secured the lower end of the handle C, whereas the upper end is supported by the braces D.

On said beam is mounted the seed-box or hopper E, the bottom of which is formed of a disk, F, fig. 4, in the margin of which is a series of holes, $a$, of different sizes, the purpose of which will presently be shown.

In the sides of the upper part of the seed-box is journaled a rock-shaft, G, fig. 2, one end of which projects through the side of the hopper, and is there bent downward forming an arm, H, fig. 4, whereby said rock-shaft is attached to a vibrator, I.

A vibratory action is obtained to the vibrator by means of a lever, J, fig. 4, pivoted to the beam at the point $b$, one end of the lever being attached to the vibrator, whereas the opposite end is made to engage the teeth of the zigzag wheel K, whereby the lever is vibrated, and thus gives a reciprocating movement to the vibrator, which in turn operates the shaft G, from the center of which depends an arm or agitator, indicated by the dotted lines $c$, fig. 1.

The lower end of said agitator is directly over the center of the bottom of the hopper.

The disk referred to is so arranged in its relation therewith, that the holes $a$ therein, above described, will, on turning the disk, pass directly under the depending end of the agitator, as shown in fig. 2.

The practical operation of this machine is as follows:

The operator holds the machine by the handles C and drives it before him. As the machine advances, the seed falls from the box E through the conductor L, fig. 1, into the furrow made by the share M, which is then immediately covered by the scrapers or wings N, and then pressed down by the roller O, thereby completing the work of planting.

Said roller also serves as a gauge for regulating the depth of the furrow, so that the seed can be planted at any required depth, the adjustment of the roller being made by the removal of the key P, whereby the standard Q supporting the roller is secured in the beam.

As above said, the several holes $a$ in the disk are of different sizes, the larger holes being for the passage of the larger kinds of seed, and the smaller ones for the finer seeds. As the disk is pivoted at the center it can be easily turned, so as to bring either of the holes in open relation to the conductor, and immediately under the lower end of the agitator, which, while the machine is in operation, agitates the seed at the opening, causing thereby a uniform and constant flow of the seed and preventing it from clogging.

This machine may be used as a hand-cultivator by removing the conductor and roller, and substituting therefor the scuffle-hoe, fig. 5, or the shares represented in figs. 6 and 7; the machine thus changed is at once a most useful implement for stirring the soil either for the purpose of cultivation, or for the cleaning of garden-walks, &c.

Claims.

What I claim as my improvement, and desire to secure by Letters Patent, is—

1. The driving-wheel B, and zigzag-wheel K, as arranged, in combination with the lever J, vibrator I, and agitator $c$, in the manner substantially as described, and for the purpose specified.

2. The arrangement and combination of the hopper E, revolving disk F, conductor L, share M, scrapers or wings N, and roller O, in the manner substantially as described, and for the purpose set forth.

PRUDDEN ALLING.

Witnesses:
W. H. BURRIDGE,
D. L. HUMPHREY.